US007197497B2

(12) United States Patent
Cossock

(10) Patent No.: US 7,197,497 B2
(45) Date of Patent: Mar. 27, 2007

(54) METHOD AND APPARATUS FOR MACHINE LEARNING A DOCUMENT RELEVANCE FUNCTION

(75) Inventor: David Cossock, Berkeley, CA (US)

(73) Assignee: Overture Services, Inc., Pasadena, CA (US)

( * ) Notice: Subject to any disclaimer, the term of this patent is extended or adjusted under 35 U.S.C. 154(b) by 357 days.

(21) Appl. No.: 10/424,170

(22) Filed: Apr. 25, 2003

(65) Prior Publication Data

US 2004/0215606 A1 Oct. 28, 2004

(51) Int. Cl.
*G06F 7/00* (2006.01)

(52) U.S. Cl. ................................................ 707/7; 707/1

(58) Field of Classification Search .......... 707/1–104.1
See application file for complete search history.

(56) References Cited

U.S. PATENT DOCUMENTS

| | | | | |
|---|---|---|---|---|
| 5,696,962 | A * | 12/1997 | Kupiec | 707/4 |
| 5,909,510 | A * | 6/1999 | Nakayama | 382/229 |
| 6,026,388 | A * | 2/2000 | Liddy et al. | 707/1 |
| 6,119,114 | A * | 9/2000 | Smadja | 707/7 |
| 6,651,057 | B1 * | 11/2003 | Jin et al. | 707/5 |
| 7,062,485 | B1 * | 6/2006 | Jin et al. | 707/3 |
| 2002/0114394 | A1 * | 8/2002 | Ma | 375/240.16 |
| 2003/0040930 | A1 * | 2/2003 | Zhai | 705/1 |
| 2003/0061214 | A1 * | 3/2003 | Alpha | 707/7 |
| 2003/0074353 | A1 * | 4/2003 | Berkan et al. | 707/5 |
| 2004/0059736 | A1 * | 3/2004 | Willse et al. | 707/100 |
| 2005/0004943 | A1 * | 1/2005 | Chang | 707/104.1 |
| 2005/0033745 | A1 * | 2/2005 | Wiener et al. | 707/10 |

OTHER PUBLICATIONS k.L Kwok & L. Grunfeld, "TREC-4 Ad-Hoc, Routing Retrieval and Filtering Experiments using PIRCS", Computer Science Dept., Queens College, CUNY, Flusing, NY, 8 pages.*
Friedman, J.H. "Greedy Function Approximation: A Gradient Boosting Machine," The Annals of Statistics 29(5), Oct. 2001., PA. 2145-45145.
Gey, F. C. "Inferring the Probability of Relevance Using the Method of Logistic Regression", SIGIR 1994: 222-231.
Kleinberg J., "Authoritative sources in a hyperlinked environment," in Proceedings of the Nineth Annual ACM-SIAM Symposium on Discrete Algorithms, 1998., pp. 668-677.

(Continued)

*Primary Examiner*—Don Wong
*Assistant Examiner*—Linh Black
(74) *Attorney, Agent, or Firm*—Dreier LLP

(57) ABSTRACT

Provided is a method and computer program product for determining a document relevance function for estimating a relevance score of a document in a database with respect to a query. For each of a plurality of test queries, a respective set of result documents is collected. For each test query, a subset of the documents in the respective result set is selected, and a set of training relevance scores is assigned to documents in the subset. In one embodiment, at least some of the training relevance scores are assigned by human subjects who determine individual relevance scores for submitted documents with respect to the corresponding queries. Finally, a relevance function is determined based on the plurality of test queries, the subsets of documents, and the sets of training relevance scores.

56 Claims, 6 Drawing Sheets

OTHER PUBLICATIONS

Page L., Brin S., Motwani R., and Winograd T., "The PageRank citation ranking: Bringing order to the Web," http://citeseer.nj.nec.com/page98pagerank.html, website last accessed Apr. 10, 2003, pp. 1-17.

Schapire, R.E. "The Boosting Approach to Machine Learning: An Overview", in MSRI Workshop on Nonlinear Estimation and Classification, 2002, pp. 1-23.

*Indexing by Latent Semantic Analysis*, Deerwester, et al., 1990, pp. 1-33.

*The INQUERY Retrieval System*, Callan, et al., 1992, pp. 1-9.

*Query Expansion Using Local and Global Document Analysis*, Xu, et al., 1996, pp. 1-8.

*Publication Query Results*, http://ciir.cs.unmass.edu/cgi-bin/irdemo/pubdb__scripts/oldsearch__pub.pl. Dec. 11, 2003, pp. 1-3.

* cited by examiner

METHOD AND APPARATUS FOR MACHINE LEARNING A DOCUMENT RELEVANCE FUNCTION

FIELD OF THE INVENTION

The present invention relates to the field of search engines for locating documents in a database, such as an index of documents stored on servers coupled to the Internet or in an intranet, and in particular the present invention relates to a method and apparatus for determining a document relevance function for estimating a relevance score of a document in a database with respect to a query.

BACKGROUND OF THE INVENTION

Development of a search engine that can index a large and diverse collection of documents, yet return to a user a short, relevant list of result documents in response to a query has long been recognized to be a difficult problem. The Internet, currently containing billions of documents stored on host computers around the world, represents a particularly diverse and large collection of documents. A user of a search engine typically supplies a short query to the search engine, the query containing only a few terms, such as "hazardous waste" or "country music" and expects the search engine to return a list of relevant documents. In reality, although the search engine may return a list of tens or hundreds of documents, most users are likely to only view the top three or two documents on the list returned by the search engine. Thus, to be useful to a user, a search engine must be able to determine, from amongst billions of documents, the two or three documents that a human user would be most interested in, given the query that the user has submitted. In the past, search engine designers have attempted to construct relevance functions that take a query and a document as their input and return a relevance value. The relevance value may be used, for example, to create a list of the documents indexed by the search engine, the list ranking the documents in order of relevance to the query, to serve this need. For the top two or three documents on this list to be useful to a user, the underlying relevance function must be able to accurately and quickly determine the relevance of a given document to a query.

A user's perception of true relevance is influenced by a number of factors, many of which are highly subjective. These preferences are generally difficult to capture in an algorithmic set of rules defining a relevance function. Furthermore, these subjective factors may change over time, as for example when current events are associated with a particular query term. As another example, changes over time in the aggregate content of the documents available in the Internet may also alter a user's perception of the relative relevance of a given document to a particular query. A user who receives a return list from a search engine that contains documents that he does not perceive to be highly relevant will quickly become frustrated and abandon the use of the search engine.

Given the above background, it is desirable to devise a method to determine a document ranking function that reflects one or more human users' perceptions of document relevance to a query, but can still readily be implemented as an algorithm on a computer. Additionally, it is desirable to devise a method that can rapidly adapt to changes in both the underlying documents in the database and in users' interests over time.

SUMMARY OF THE INVENTION

The present invention provides a method for determining a document relevance function for estimating a relevance score of a document in a database with respect to a query. First, for each of a plurality of test queries, a respective set of result documents is collected from the database. Next, for each test query, a subset of the documents in the respective result set is selected and a set of training relevance scores is assigned to documents in the subset. Finally, a relevance function is determined based on the plurality of test queries, the subsets of documents, and the sets of training relevance scores.

Some embodiments further provide a method of selecting a subset of the documents in the respective result set of documents for each query. First, a document is selected from the respective result set. Next, a surrogate relevance score relating the selected document to the current query is determined. Then, based on the determined surrogate relevance score, the selected document is assigned to at least one relevance tier of a plurality of relevance tiers. The selecting, determining, and assigning is then repeated until a termination condition is reached. The termination condition may be that each relevance tier contains at least a respective predefined number of documents, or may be that a highest relevance tier contains at least the predefined number of documents. Other termination conditions may be used as well.

Some of these embodiments additionally provide a method of assigning a set of training relevance scores to the documents in a subset of the documents selected from the respective result set of documents for each query. First, each of a first plurality of documents in a subset of the documents from a result set is submitted to a respective plurality of human subjects. Documents in the first plurality of documents have surrogate relevance scores within a predefined range. One or more human subjects determines an individual relevance score for the submitted document with respect to the query. Next, a training relevance score is assigned to each submitted document with respect to the query based on the individual relevance scores determined by the human subjects.

In some embodiments, to determine a relevance function, a set of features to be used as predictor variables in the constriction of the relevance function is first constructed. Each of the features in the set may be a function of one or more properties of a respective document, a respective query, or both. Then, a relevance function is parameterized in terms of a finite set of parameters (e.g., coefficients) and base functions. The relevance function takes as its input the set of features and returns a relevance value as its output. Similarly, each base function takes as its input a subset of the features and outputs a value. Next, a partial error is defined to relate the training relevance score of a given document with respect to a particular query to a value produced by the document ranking function as applied to the given document with respect to the particular query. The defining of the partial error is then repeated with respect to a plurality of given documents and a plurality of particular queries so as to produce a set of partial errors. The parameters are then selected so as to minimize a total error which is a function of the set of partial errors. Finally, a relevance function that, given a document and a query, produces a relevance value is determined. Optionally, a document ranking function is determined, based on the relevance function. The document ranking function, given a query and a plurality of documents, produces an ordered list of the documents in which the relevance values of the documents in the list monotonically decreases.

Another aspect of the present invention provides a computer program product for use in conjunction with a computer system. The computer program product includes a computer readable storage medium and a computer program mechanism stored on the medium. The computer program mechanism includes:

(a) a collecting module for collecting a respective result set of documents from the database for each of a plurality of test queries;

(b) a sampling module for selecting, for each test query of the plurality of test queries, a subset of the documents in the respective result set;

(c) a scoring module for assigning a set of training relevance scores to the documents in each selected subset; and (d) a relevance function generation module for determining a relevance function based on the plurality of test queries, the subsets of documents, and the sets of training relevance scores.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

Like reference numerals refer to corresponding parts throughout the several views of the drawings.

DESCRIPTION OF THE PREFERRED EMBODIMENTS

Figure 1:
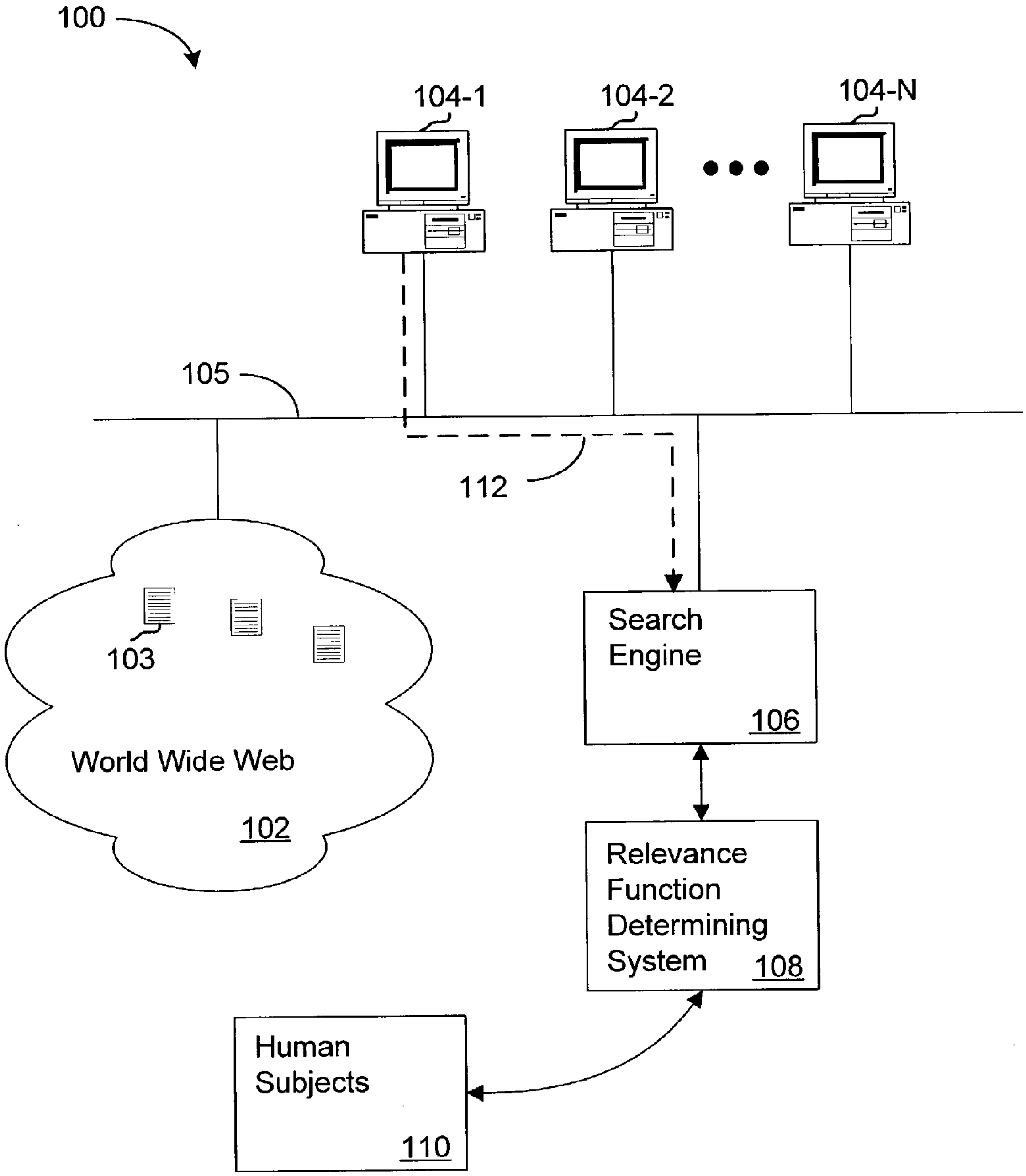
FIG. 1 illustrates a client computer submitting a query to a search engine, the search engine employing a document relevance function determined by a relevance function determining system.

Referring to FIG. 1, a computer network 100 includes one or more client computers 104 connected to a network 105. The network 105 may be the Internet or, in other embodiments, an intranet. In embodiments where the network 105 is the Internet, a collection of documents 103 known as the World Wide Web 102 are available for retrieval by the client computers through the network 105. On the Internet, documents are located by a uniform resource locator, such as "http://www.av.com." By supplying the URL to a document server (not depicted), the document 103 corresponding to the URL can be accessed.

In addition to documents and client computers, the computer network 100 includes a search engine. Examples of search engines available on the Internet include but are not limited to AltaVista (at the URL http://www.av.com), Google (at the URL http://www.google.com), and Yahoo! (at the URL http://www.yahoo.com). Search engines typically include a database, the database indexing documents on the World Wide Web. A user of a client computer 104-1 who desires to retrieve a document relevant to a particular topic, but who is unsure or ignorant of the URL of such a document, submits a query 112 to the search engine, typically through the network 105. The search engine 106, after receipt of the query 112, examines the database of documents in an attempt to find those documents that the user will regard as highly relevant to the submitted query 112.

Some embodiments provide a method of determining a document relevance function, the relevance function used by search engine 106 and determined by a relevance function determining system 108. The relevance function determining system 108 may, in some embodiments, be implemented on a different computer system than the computer system that implements the search engine 106. In other embodiments, a single computer system may be used to implement the functionality of the search engine as well as that of the relevance function determining system 108.

Embodiments of the relevance function determining system 108 collect a result set of documents for a plurality of test queries. In some embodiments, the plurality of test queries are determined, at least in part, based on logs of queries submitted by users of client computers 104 to search engine 106. In some embodiments, the result set of documents is determined by submitting the test queries to one or more search engines 106 and receiving a response, typically a list of URLs, therefrom. The relevance function determining system is optionally coupled to network 105, and can thereby retrieve one or more of the documents in the result set. Typical embodiments of the relevance function determining system include access to one or more human subjects 110. The human subjects may be employed to provide a set of training relevance scores for the documents in the result set, relative to one or more queries in the plurality of test queries.

Figure 2A:
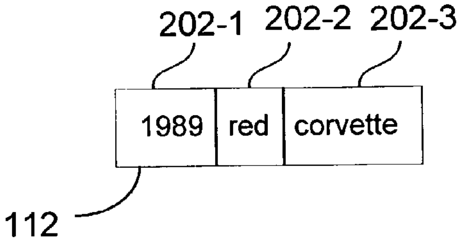
FIG. 2A illustrates an exemplary query containing one or more terms.

Referring to FIG. 2A, a typical query 112 includes one or more terms 202. For example, the query depicted contains three terms. Such a query is referred to as a "three-term" query. Similarly, queries containing only one term are referred to as "one-term" queries, and queries containing two terms are referred to as "two-term" queries. The individual terms are delimited by a blank space, or possibly some other means, when submitted by the user.

Figure 2B:
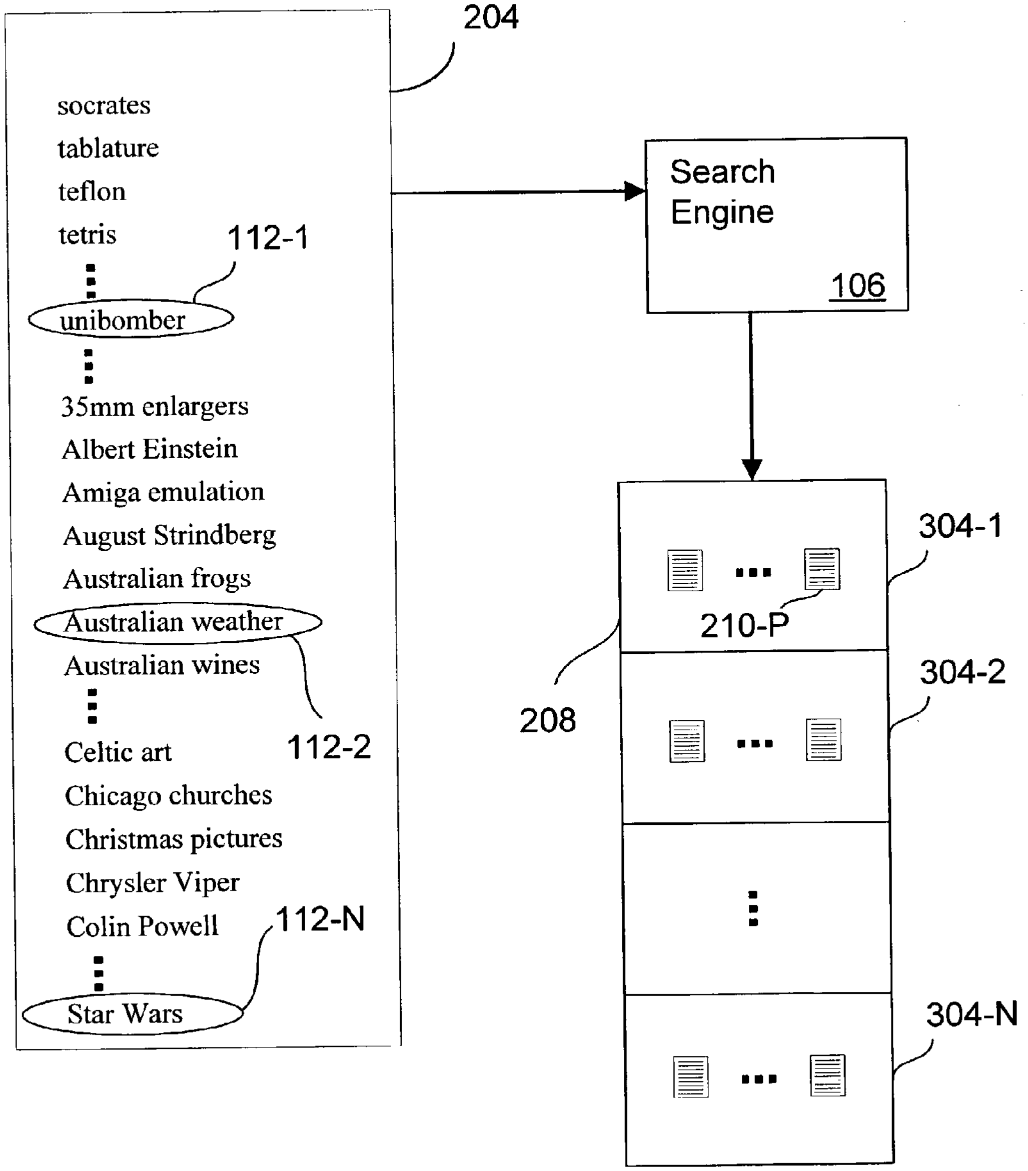
FIG. 2B illustrates a test set of queries and the submission of the test set of queries to a search engine, resulting in a result set of documents.

Referring to FIG. 2B, a plurality 204 of test queries includes one or more queries 112. In some embodiments, the plurality 204 includes at least one one-term query 112-1 and at least one two-term query 112-2. In other embodiments, the plurality 204 may include only one-term queries, only two-term queries, only three-term queries, or any combination of types of queries, possibly including queries having more than three terms.

In one embodiment, the plurality 204 is determined by sampling of queries from one or more logs, stored by search engine 106 of user-submitted queries 112 to the search engine. A preliminary set of query strings is first sampled from the logs. Queries relating to subject matter determined to be outside the scope of knowledge of a user base are then eliminated. Finally, the remaining queries in the preliminary set are assigned to the plurality 204 of test queries.

In another embodiment, the plurality of test queries are selected by sampling words from a lexicon of one-word entries and assigning each of the words so sampled to the plurality of test queries. Examples of lexicons from which words may be sampled include dictionaries, such as *Merriam-Webster's Collegiate Dictionary*, Merriam-Webster, Inc.; 10th edition (1998). In still other embodiments, combinations of two or more words are sampled from the lexicon, and the combinations assigned to the plurality 204 of test queries.

Once the plurality 204 of test queries is determined, a plurality 208 of respective result sets 304 of documents from the database is collected. In some embodiments, each test query 112 in the plurality 204 of test queries is submitted to a search, engine 106. As mentioned above, in some embodiments the database is an index of documents retrieved from the World Wide Web. In these embodiments, the result set of documents is sometimes collected by submitting each test query to a search engine, receiving from the search engine a list of documents on the World Wide Web containing one or more of the terms in the test query, and adding one or more of the documents on the list of documents to the respective result set. The search engine responds by returning a list of documents (typically referenced by their URL), each document containing at least one of the terms in the test query 112. In this way, each respective result set 304 contains one or more documents 210, and each document 210 is associated with one or more test queries 112. Each respective result set 304 preferably stores only identifying information for the documents 210 (e.g., the URL of each document, a title or partial title of the document, and a small portion of the document, which may contain one or more of the query terms) rather than the complete contents of the documents.

In other embodiments, the respective result set 304 of each test query 112 is collected by submitting each query 112 from the plurality 204 to two or more search engines indexing documents on the World Wide Web. For example, in some embodiments a test query is submitted to both AltaVista's search engine (at the URL http://www.av.com) and a second search engine. In some embodiments, the second search engine is Google's search engine (at the URL http://www.google.com). The URL's of the 200 highest ranked documents (having rankings 1–200), as determined by each search engine, is then received. Next, the five documents ranked in positions 1–5 (corresponding to highest relevance to the submitted query) by AltaVista's search engine are added to the respective result set. Additionally, five documents having randomly selected positions from amongst positions 6–200 on the ranking are selected, and these documents added to the respective result set. Next, the five documents ranked in positions 1–5 by a second search engine are added to the respective result set 208. Additionally, documents ranked in the five randomly selected positions by the second search engine are added to the respective result set. For each document on the list of URL's returned by the second search engine, if the respective result set already contains the document before the addition of documents from the list of URL's returned by the second search engine, the document at the next highest position (position having a ranking equal to one plus the value of the current position) is examined, and if it is not already in the respective result set, added to the respective result set. If, conversely, the document is again already found in the respective result set, the document at the next highest position is examined, until the end of the list of documents is reached. This is repeated, if possible, until 10 documents from the list of URL's returned by the second search engine have been added to the respective result set. Thus, in some embodiments, the respective result set includes, where possible, 20 documents.

Now that methods by which a result set of documents from the database may be collected have been described, methods of selecting a subset of documents from the result set, or from the one or more respective result sets, is described. Throughout this document, the terminology "subset" is used to designate a part of a set, including possibly all of the items in the set. Typically, the number of documents in the plurality 208 of respective result sets 304 is large, preventing economical assignment of accurate training relevance scores to all of these documents. Moreover, in some embodiments, due to limited computational resources (such as the amount of memory and the processing speed to the relevance function determining system 108 in FIG. 1) determining a document ranking function is feasible only where a relatively small number of documents have assigned training relevance scores. In this context, relatively small means 1% or less of a total. For example, in a preferred embodiment, the plurality 208 of respective result sets 304 includes more than 4000 documents, but the selected subset of documents to which relevance training scores are assigned includes only 40 documents. In another embodiment, relevance training scores are assigned to a number of documents ranging between 40 and 200.

Figure 3:
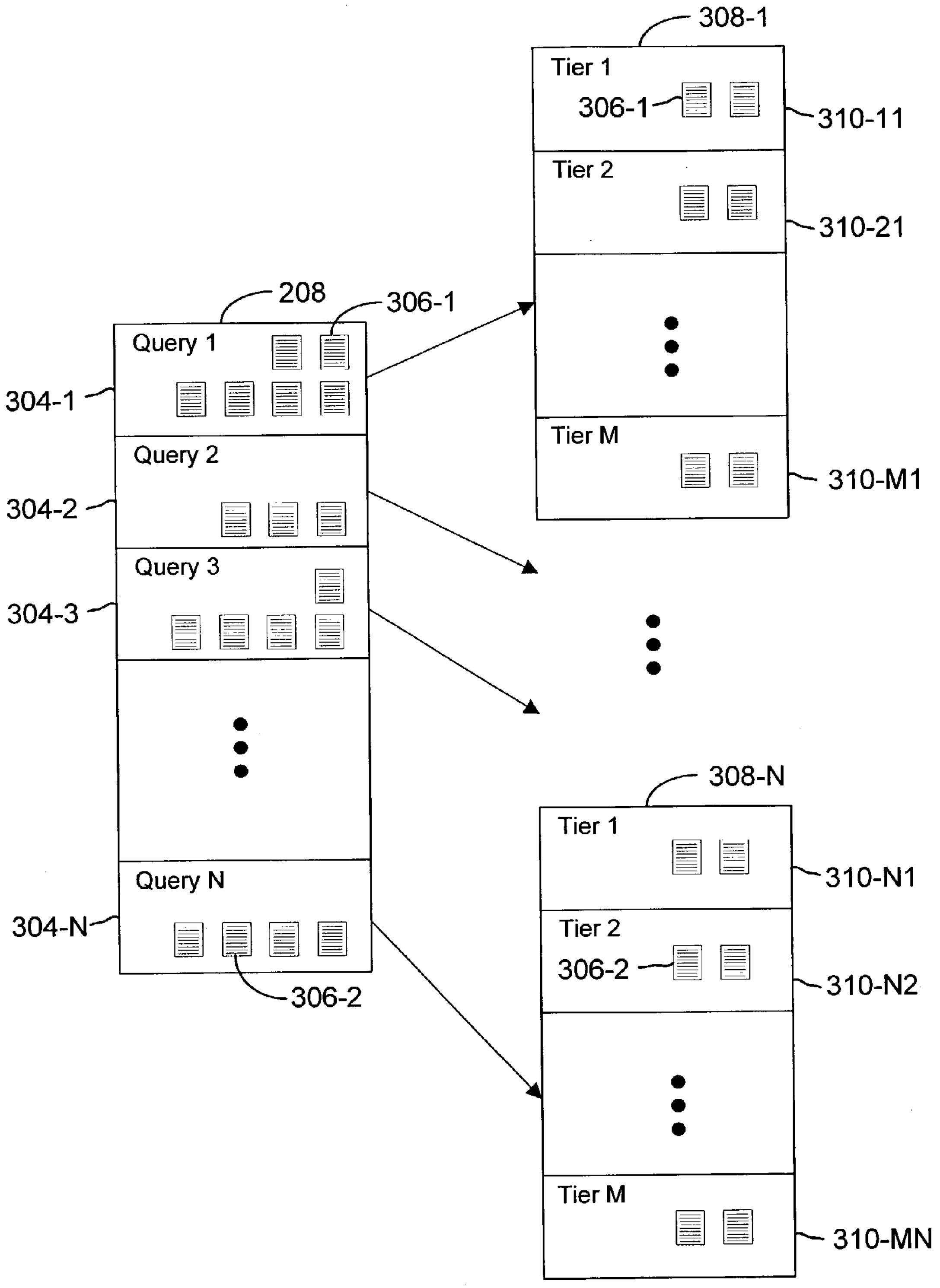
FIG. 3 illustrates a result set of documents and a plurality of relevance tiers for assignment of a subset of the documents thereto.

Referring to FIG. 3, one or more respective result sets 304 each include documents retrieved in reference to a respective one of the plurality of test queries. In some embodiments, a surrogate relevance score relating each document to the query of the respective result set containing the document is first determined. The surrogate relevance score may be determined by submitting the query of the respective result set to a search engine and determining the surrogate relevance score of the document as a function of the position of the document in a list returned by the search engine. For example, Query 1 in FIG. 3 is submitted to a search engine, and a surrogate relevance score assigned to document 306-1 as a function of the position of document 306-1 on a list provided by the search engine in response to the submission of Query 1.

Next, for each respective result set 304, a set 308 of relevance tiers is established. Each set 308 of relevance tiers includes one or more relevance tiers 310. In some embodiments, each relevance tier 310 has associated with it a minimum surrogate relevance score and, optionally, a maximum surrogate relevance score. In some embodiments, one or more of the documents in the respective result set 304 is assigned to each relevance tier 310 in such a way that the surrogate relevance score of the document is greater than or equal to the minimum surrogate relevance score associated with the relevance tier. The one or more documents in the respective result set 304 may be selected in a number of ways, for example by random sampling from amongst the documents in the respective result set 304 An example of assigning a document is illustrated by document 306-1, which may have a surrogate relevance score of 10. The minimum relevance surrogate score associated with relevance tier 310-11 may be 8. Thus, document 306-1 is assigned to tier 310-11. Other methods for selecting and assigning documents from the respective result set 304 to relevance tiers 310 are possible. The relevance tiers typically include documents representing results with low surrogate relevance scores.

In some embodiments, each relevance tier 310 additionally has an associated maximum surrogate relevance score.

For example, tier 310-N2 may have an associated minimum relevance score of 4 and an associated maximum relevance score of 8. Relevance tier 310-N1 may have an associated maximum relevance score of 100 and an associated minimum relevance score of 8. In these embodiments, a document is assigned to a given relevance tier if the surrogate relevance score of the document is less than the maximum surrogate relevance score associated with the tier and greater than or equal to the minimum relevance surrogate score associated the tier. For example, document 306-2 may have a surrogate relevance score of 5. Thus, document 306-2 is assigned to relevance tier 310-N2, but not assigned to relevance tier 310-N1. In some of these embodiments, the range of relevance scores associated with the maximum and minimum score for each tier is selected so that the ranges are nonoverlapping. In another embodiment, the ranges overlap, for example with each tier having an assigned minimum score but no assigned maximum score.

In some embodiments, the process of assigning documents from the respective result set 304 to relevance tiers 310 is repeated until each relevance tier 310 contains at least a respective predefined number of documents. For example, in some embodiments, the process of assigning is repeated until at least 10 documents are assigned to each relevance tier. In another embodiment, the minimum number of documents required for each tier may be different. For example, the minimum number of documents required for tiers 1, 2 and 3 maybe 10, 40 and 100, respectively.

Now that methods of selecting a subset of documents has been described, methods for assigning a relevance training score to documents in the subset are described. In some embodiments, a first plurality of the documents from the relevance tiers 310 is submitted to one or more human subjects (element 110 in FIG. 1). For example, the first plurality of documents may include documents only from the first (i.e., highest) relevance tiers 310–11, . . . , 310-N1 associated with each query in the plurality of test queries. The human subjects examine each document submitted to them, along with the associated query, and determine an individual relevance score relating the document to the query. In some embodiments, a large number (e.g., fifty) of human subjects are employed to evaluate each document, providing a statistically reliable set of individual relevance scores.

In some embodiments, each human subject is presented with a number of document-query pairings and a survey form including the following statements:

Imagine you are at your favorite search site. You are searching for <query> because <context associated with that query>. For example, you are searching for "planets in the Milky Way" because you want to find the names of the planets in the Milky Way.

Among the many query results delivered by your favorite search site is the following URL: <URL of document>. Click on the URL, read the document that resides there, and after you have evaluated the document, indicate how relevant it was to the query by assigning it a score from amongst the following numbers: 1, 2, 3, 4, 5, 6, 7, 8, 9, & 10. Please use the number 10 to indicate the highest possible relevance and the number 1 to indicate the lowest possible relevance.

Thus, in these embodiments a human subject assigns an individual relevance score from amongst one of the numbers 1–10, 10 indicating the highest relevance and 1 indicating the lowest relevance. In some embodiments, the arithmetic average of the individual scores is determined, and the average used as the training relevance score of the document. Other methods of determining the training relevance score of the document are also possible, including but not limited to using the median of the individual relevance scores and using the arithmetic average of a sample of the individual relevance scores selected to have a variance below a predetermined threshold.

In some embodiments, training scores are assigned to documents in a second plurality of documents selected from the documents in the subset. The second plurality may include all documents in the subset that have not been submitted to human users as part of the first plurality of the documents. In some embodiments, documents in the second subset are assigned a predetermined low relevance training score. For example, documents from the lowest respective relevance tier 310-M1, 310-M2 (for a second query, not shown), . . . , 310-MN may be assigned a predetermined relevance score of 0. In some embodiments, documents from the next lowest respective relevance tiers for each query may be assigned a predetermined relevance score of 1.5, and so on for the other tiers having documents in the second subset. In this way, all of the documents in the relevance tiers 310 may be assigned a training relevance score without submitting all of the documents to human subjects. Obtaining individual relevance scores from human subjects for all of the documents in the relevance tires 310 may be prohibitively expensive. Furthermore, little information is typically gained from low individual relevance scores assigned to documents by human subjects.

Now that methods of assigning a training relevance score to a document have been described, methods of determining a relevance function based of the subsets of documents, the assigned training relevance scores, and the plurality of test queries are described. In some embodiments, machine learning techniques are used for this purpose. Machine learning techniques, in addition to minimizing an error associated with the training relevance scores and the relevance scores produced by the relevance function, determine a relevance function in such a way that the relevance score produces for new queries (not contained in the test set of queries) or new documents (not in the relevance tiers) is close to the training relevance score that would have been determined for a document relative to a query, had the document been in the relevance tiers and the query in the test set. In some embodiments, logistic regression is used as a machine learning technique for determining a relevance function. Logistic regression has been demonstrated, via retrospective experiments, to improve relevance ranking in the context of information retrieval. See, for example, Gey, F. C. "Inferring the Probability of Relevance Using the Method of Logistic Regression", SIGIR 1994: 222–231, which is hereby incorporated by reference in its entirety.

Figure 4:
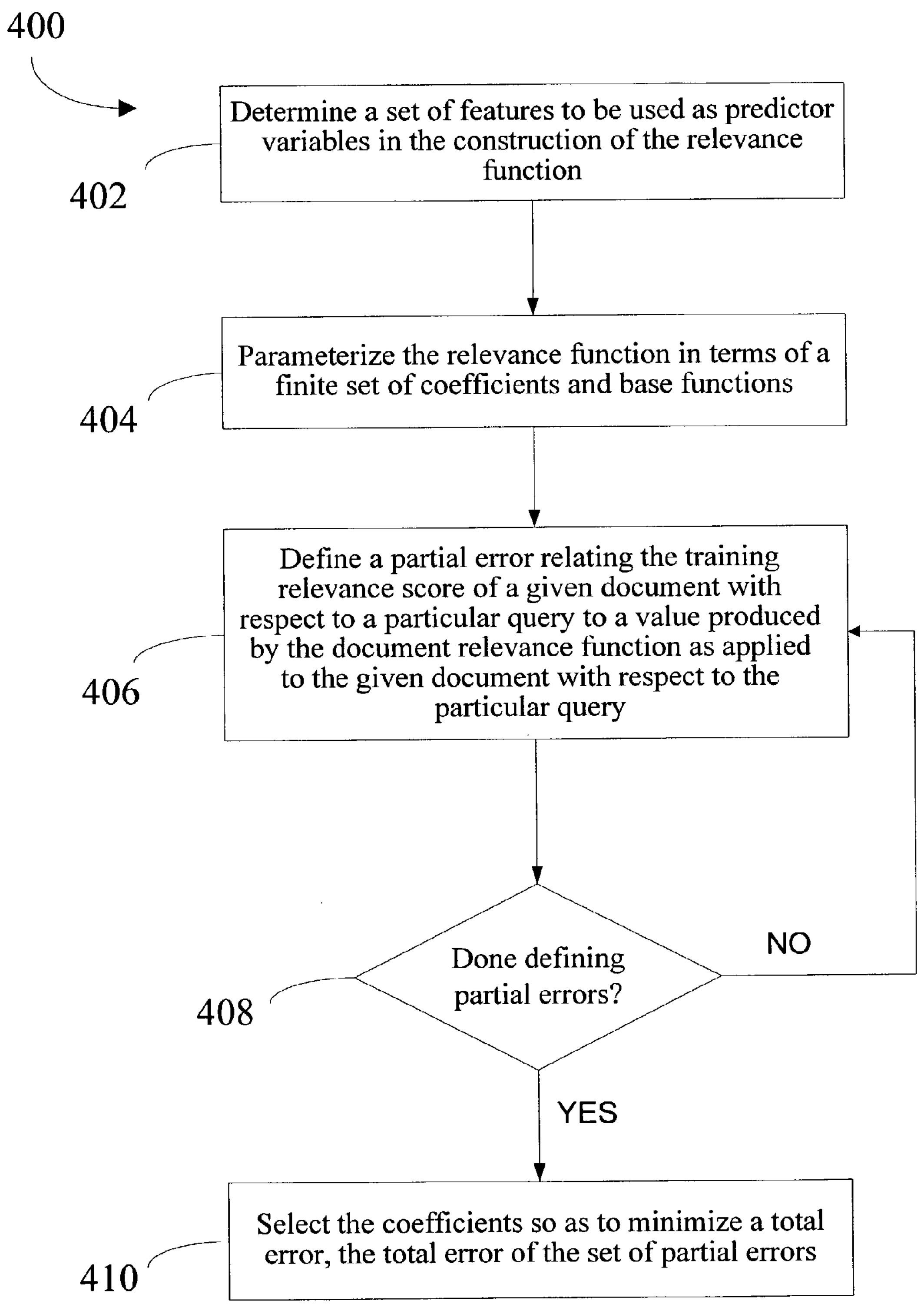
FIG. 4 is a flow chart of a relevance function determining method.

Referring to FIG. 4, in a method 400 for determining a relevance function, in step 402 a set of features to be used as predictor variables is first determined. The set of features are to be used as predictor variables in the construction of the relevance function. A feature, as meant by this document and the attached claims, is a means of quantifying an aspect of the relationship of a query to a document, or of an aspect of the document itself. Given a document and, possibly, a query, a feature returns a value. Features that return a value based only the contents of a document itself are referred to as query-independent features. Query-independent features may depend on properties of the document itself. Additionally, query-independent features may depend on properties of the server on which the document is located, and possibly properties of the relationship of this server to other servers on the Web. Features that require both a document and a query to return one or more values are referred to as query-dependent features. Throughout this document, the $i^{th}$ feature selected to relate a document to a query is denoted $z_i$. The set of features selected, including one or more individual features are, for notational convenience, denoted z, where $z=\{z_1,z_2, \ldots ,z_F\}$, and F is the number of features so selected.

Examples of query-independent features that may be included in the set of features include, but are not limited to:

Eigenrank (ER): one or more values associated with elements of an eigenvector of a stochastic matrix derived from the incidence matrix of the web, where links are considered edges of a directed graph, see Page L., Brin S., Motwani R., and Winograd T., "The PageRank citation ranking: Bringing order to the Web," http://citeseer.nj.nec.com/page98pagerank.html, website last accessed Apr. 10, 2003, hereby incorporated by reference in its entirety;

HUB: a value related to the connectivity of the incidence matrix of the web, specifically the so-called Kleinberg application of singular value decomposition to the graph, see Kleinberg L., "Authoritative sources in a hyperlinked environment," in Proceedings of the Nineth Annual ACM-SIAM Symposium on Discrete Algorithms, 1998, hereby incorporated by reference in its entirety;

URL Depth: a value representing the depth of traversal of a web site needed to retrieve a document, determined based on, at least in part, the number of "/"'s in a URL;

Quality Score: a value representing the authority of a document, determined as a function of other features of the document;

Spam Index: a value indicating whether a document is likely to be a "spam document," for example a value of "1" when a document contains excessive repetition of a term, indicating the document has been designed to artificially enhance relevance relative to a query containing the term;

Family Friendliness: a value used to indicate whether a document contains content likely to be found objectionable to family-oriented users, for example a value of "1" when a document contains one or more of a list of certain pornographic terms and a value of "0" otherwise;

Document Length: the number of individual terms in the document, expressed as an integer.

Examples of query-dependent features that may be included in the set of features include, but are not limited to:

Anchor Text Score: a value representing the number of documents containing both a link to the current document and one or more terms in the current query;

Match Location: within a document, a value indicating whether a term from a query can be found in the title or the body of the document, and if the term is found in the body but not the title, a value indicative of how deep in the body the term is found;

Match Frequency: a value indicating how many times a term from a query is found in a document, for example, the number of times any term from the query is found in a document;

Term Weight: a standard feature in the art of information retrieval (IR), for example the inverse of the logarithm of the number of times a term from the query is found within the database of documents, expressed as a fraction of the total database size; and Proximity: a value indicating, for multi-term queries, whether or not the terms in the query can be found adjacent to one another in the document.

In some embodiments the set of features selected includes all of the features described above. Thus, in these embodiments z={Eigenrank (ER), Hub, URL Depth, Quality Score, Spam Index, Family Friendliness, Document Length, Anchor Text Score, Match Location, Match Frequency, Term Weight, and Proximity}. In other embodiments, a subset of these features may be selected. In still other embodiments, features in addition to those listed above may be included in the set of features, for example, derived features that are themselves functions of subsets of the features above.

Again referring to FIG. 4, the next step in a method 400 of determining a document relevance function is step 404 In step 404, the relevance function is parameterized in terms of a finite set of coefficients and base function. In some embodiments, the ranking function is parameterized as a linear function of the features, $$p(z) = \sum_{r=1}^{R} c_r z_r,$$

in which R is the number of coefficients that, once determined, define a relevance function p(z) in terms of the R features z. In other embodiments, the parameterization of the relevance function may involve more complex functions of the features, for example $$p(z) = \sum_{r=1}^{R} c_r a_r(z),$$

in which each base function $a_r(z)$ takes as input a subset of the set of features, possibly including all of the set of features, and outputs a value. The base functions may include quadratic functions of some of the set of features, for example $a_1(z)=z_1z_3$, $a_2(z)=z_2^2$, or $a_3(z)=z_2Z_3$. The base functions may also include more general, nonlinear functions of ones of the set of features, for example $a_4(z)=\sqrt{z_1}$, $a_5(z)=|z_2|$, or $a_6(z)=z_3/z_1$.

In some embodiments, the base functions themselves are parameterized by coefficients. For examples, the base functions may include wavelet functions, for instance with each wavelet function related to a mother wavelet through a process of dilation, translation, or other possible processes, the precise relationship determined by additional coefficients. In some embodiments, the base functions may include neural networks. In embodiments where the base functions themselves depend on coefficients, the relevance function is parameterized in the following way $$p(z) = \sum_{r=1}^{R} c_r a_r(z; d_1, \ldots , d_{J_r}),$$

where the number of coefficients, $J_r$, associated with each base function, $a_r$, may be different for each base function. In some embodiments, the relevance function is a general, nonlinear function of the coefficients and the base functions, $$p(z) = P\left(\sum_{r=1}^{R} c_r a_r(z; d_1, \ldots, d_{J_r})\right).$$

Figure 5:
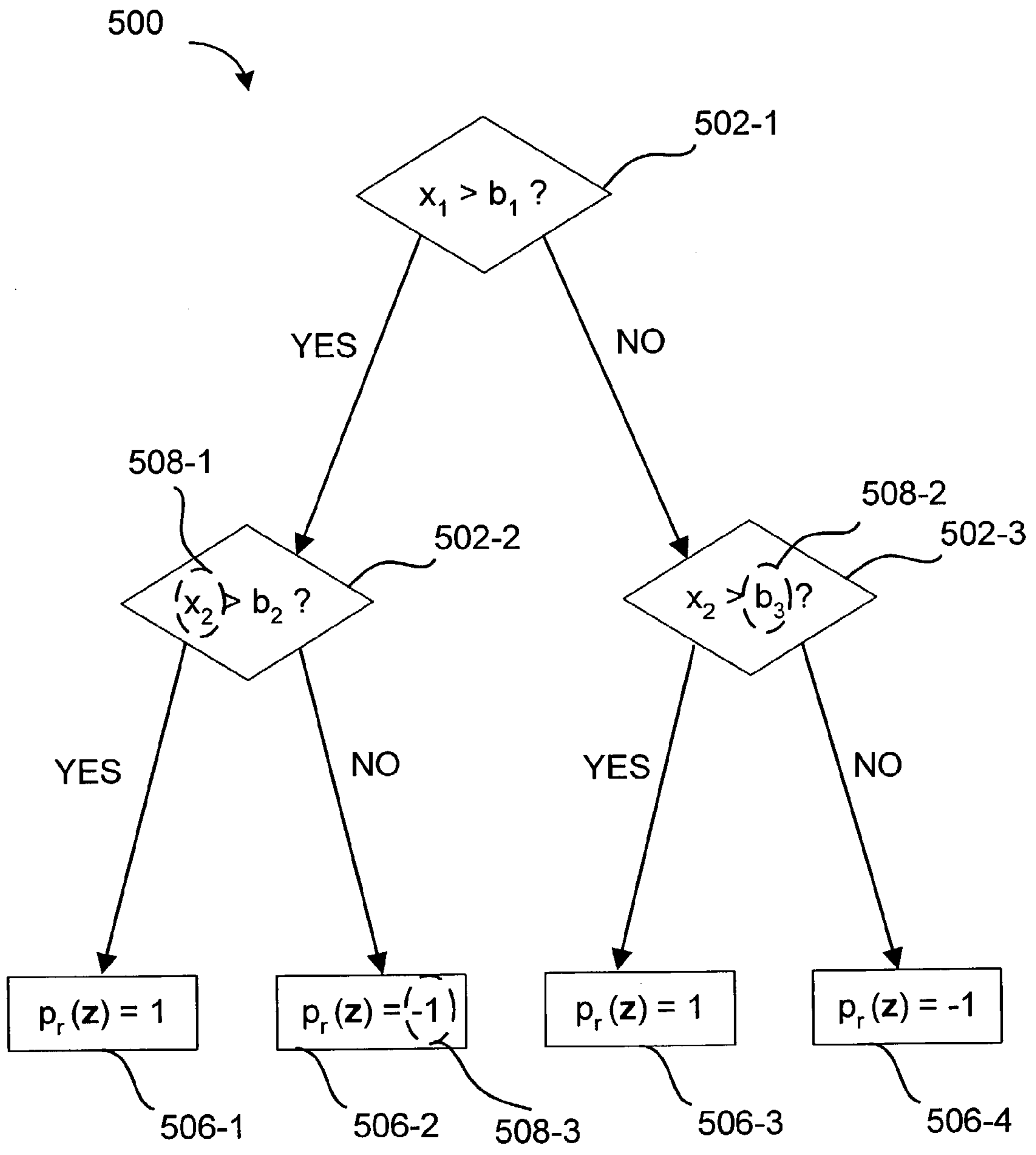
FIG. 5 is a block diagram of an exemplary base function, in this case a binary classification tree.

In some embodiments, the base functions include decision trees. For example, a base learner may be a binary classification tree 500, as depicted in FIG. 5. Referring to FIG. 5, a binary classification tree in block 502-1 examines a first "splitting variable," $x_1$, and compares its value to a "splitting location" $b_1$. For example, the splitting variable is equal to the value of one of the features, $x_1=z_1$. In another example, the splitting variable is a linear or nonlinear function of one or more of the features in the set of selected features. Depending on the result of the comparison performed in block 502-1, the flow of the tree proceeds to either block 502-2 or block 502-3. Each block 502 has associated with it a splitting variable and a splitting location. Thus, the splitting variables (for example 508-1) and splitting locations (for example 508-2) are coefficients 508 that are needed to determine the base function represented by tree 400.

Finally, based on the comparisons made in blocks 502, the flow of the tree proceeds to one of the four terminal nodes 506. In each terminal node, a terminal value (for example, 508-3), is assigned as the value of the base function. In FIG. 5, the tree 400 is a binary classifier and the terminal values only assume values of "−1" or "1," corresponding to one or the two classes into which the tree 400 classifies documents. The terminal values (for example, 508-3) are also coefficients 508 that are needed to determine the base function represented by tree 400.

In still other embodiments, the base functions include classification and regression (CART) trees. CART trees may be used to parameterize the relevance function itself or, in some embodiments, the gradient of the relevance function with respect to a subset of the parameters. For a complete description of CART trees, including methods of selecting parameters of CART trees to minimize an error, see, L. Breiman, J. H. Friedman, R. A. Olshen, and C. J. Stone, *Classification and Regression Tress*, Belmont, Calif.: Wadsworth, 1984, which is hereby incorporated by reference in its entirety.

In some embodiments where the base functions are binary classification trees, the relevance function is determined as a function of a linear combination of the terminal values returned from application of each base function to the set of selected features. To determine a relevance function in these embodiments case, a master classifier is first constructed. The master classifier can be expressed as a "vote" of the results of a linear combination of the base functions, $$M(z) = \text{sign}\left[\sum_{r=1}^{R} c_r a_r(z; d_1, \ldots, d_{J_r})\right],$$

where each base function (tree) is denoted $a_r$, the parameters (splitting variables, splitting locations, and terminal values) of the base functions are denoted $d_1, \ldots, d_J$, the parameters of the combination of the base functions are denoted $c_r$, and the sign(·) function "votes" by assigning a value of "1" to the master classifier when its argument is positive or zero and a value of "−1" otherwise. In these embodiments, the relevance function is the inverse logistic transform of the weighted sum of the base functions:

$$p(y=1 \mid z) = \frac{\exp(S(z))}{1+\exp(S(z))},$$

where $$S(z) = \sum_{r=1}^{R} c_r a_r(z; d_1, \ldots, d_{J_r})$$

and exp(·) represents the exponential function. The notation y=1 indicates that, given the features, the probability measures the likelihood that the document belongs to the class associated with the value "1." As discussed below in conjunction with step 406, in these embodiments the class associated with the value "1" is the class of documents considered to be highly relevant to a query. Thus, the value of this probability is itself used as an estimate of the relevance of the document to a query.

Before describing the details of the next step 406 in a method 400 (FIG. 4) of determining a relevance function, the relationship between the determined relevance function and the training relevance scores is further described. Referring to FIG. 3, the relevance tiers 310 contain one or more documents, each document assigned a training relevance score relating it to the query associated with the respective result set 304 from which it originated. For notational convenience, the training relevance score of the $j^{th}$ document in the $m^{th}$ relevance tier associated with the $n^{th}$ query is denoted $y_{nmj}$. The values of the features are also possibly dependent on the query and the document, so the value of the features associated with the $j^{th}$ document in the $m^{th}$ relevance tier associated with the $n^{th}$ query are similarly denoted $z_{nmj}$. Machine learning techniques, such as those disclosed herein, determine a document relevance function based on partial errors associated with the training relevance scores and values of the features in the relevance tiers. Documents in the relevance tiers represent a small (generally, less than 1%) portion of the documents that will be encountered when the relevance function is used, for example, to characterize documents from the Web relative to queries that are not in the test set of queries. Thus, machine learning techniques must also attempt to control the "generalization error," i.e. the error associated with the relevance score produced by the relevance function and the relevance score a user would determine for a query not in the test set of queries or for a document not in the relevance tiers.

In some embodiments, step 406 of a method 400 includes defining a partial error $e_{nmj}$ associated with the $j^{th}$ document in the $m^{th}$ relevance tier and the $n^{th}$ query as a function of the square of a difference between the training relevance score for the document and query and the value produced by the relevance function, $$e_{nmj}=(y_{nmj}-p(z_{nmj}))^2.$$

In other embodiments, the error is defined as a function of the absolute value of a difference between the training relevance score and the value produced by the relevance function, $$e_{nmj}=|y_{nmj}-p(z_{nmj})|.$$

In still other embodiments, a training classification function is first defined, the classification function assigning a document to at least one of a number of classes based, at least in part, on the training relevance score of the document. For example, referring again to FIG. 3, a training classification function may be defined such that all documents from the highest relevance tiers 310–11, . . . and 310-N1 associated with each test query is assigned to a first class. Membership in this class may be associated with the value "1." Documents in the relevance tiers 310 not classified as being members of the first class may be assigned to a second class. Membership in the second class may be associated with the value "−1." In some embodiments, more than two classes may be defined in a similar manner.

In embodiments in which the training classification function is a binary classifier, assigning documents to one of two classes, a partial error is defined $$e_{nmj}=\exp(-y_{nmj}\hat{P}(z_{nmj})).$$

where $\hat{P}(z_{nmj})$ is the logistic transform of the relevance function, i.e., $$\hat{P}(z_{nmj})=\frac{1}{2}\log\left(\frac{p(z_{nmj})}{1-p(z_{nmj})}\right).$$

Referring to FIG. 4, a method 400 of determining a relevance function repeats step 406 of defining a partial error one or more times. Step 408 determines whether or not more partial errors are to be determined. In some embodiments, partial errors are repeatedly defined by step 406 until a partial error has been defined for each document in each relevance tier (310, FIG. 3) for each respective query. Step 410 of method 400 then selects coefficients of the relevance function so as to minimize a total error. In some embodiments the total error is simply the sum of the partial errors for all documents in each relevance tier associated with each query in the plurality of test queries $$e^{tot}=\sum_{n}\sum_{i}\sum_{j}e_{nmj}.$$

In other embodiments, the total error may be a more complex function of the partial errors, for example a weighted sum of the partial errors or the sum of the squares of the partial errors.

For any parameterization of the relevance function, the parameters (e.g. coefficients) of the relevance function are determined so as to minimize the total error. In some embodiments, the selection of the parameters that minimize the total error may also be accomplished via a Boost procedure. For example, one version of a Boost procedure, AdaBoost (pseudo-code of which is available from Schapire, R. E. "The Boosting Approach to Machine Learning: An Overview", in MSRI Workshop on Nonlinear Estimation and Classification, 2002, hereby incorporated by reference in its entirety) may be used to determine a sequence of sets of weights that are applied in determining the total error as a weighted sum of the partial errors. The parameters of the relevance function, for each set of weightings, is determined so as to minimize the total error as determined with that set of weightings. See, for example, Schapire, supra. As another example, an implementation of the gradient boosting algorithm, GradientBoost, may be used to select the parameters of the relevance function that minimize the total error. See, for example, Friedman, J. H. "Greedy Function Approximation: A Gradient Boosting Machine," The Annals of Statistics 29(5), October 2001, which is hereby incorporated by reference in its entirety. GradientBoost is a particularly attractive technique to use for this purpose when the base functions are classification and regression (CART) trees. For a complete description of CART trees, including methods of selecting parameters of CART trees to minimize an error, see, L. Breiman, J. H. Friedman, R. A. Olshen, and C. J. Stone, *Classification and Regression Tress*, Belmont, Calif.: Wadsworth, 1984, which is hereby incorporated by reference in its entirety. Other methods to determine the coefficients of the relevance function so as to minimize the total error are possible, including any algorithm which seeks to minimize the generalization error of a function based on a sample of inputs and outputs to the function.

Once the relevance function has been determined, in some embodiments it is employed to further determine a ranking function. First, a user submits a query to the search engine. Next, a set of documents is retrieved from the database that are to be ranked for relevance with respect to the query. In some embodiments, only documents including one or more of the terms in the query are including in this set. In other embodiments, other criteria may be used to select this set. Next, for each document, the values of the selected set of features is evaluated for the document as paired with the query. The relevance function is then used to determine a relevance value for the document as paired with the query. Once the relevance value has been determined for each document in the set, an ordered list of the set of documents is produced. The ordered list is determined so that the documents on the list are ordered in a sequence of decreasing relevance. Thus, the document that appears first on the ordered list will have the numerically greatest relevance value of all the documents in the set and the document that appears last of the ordered list will have the minimal relevance score of all the documents in the set. Methods for ordering a list in this way are well known in the art of data structures.

Figure 6:
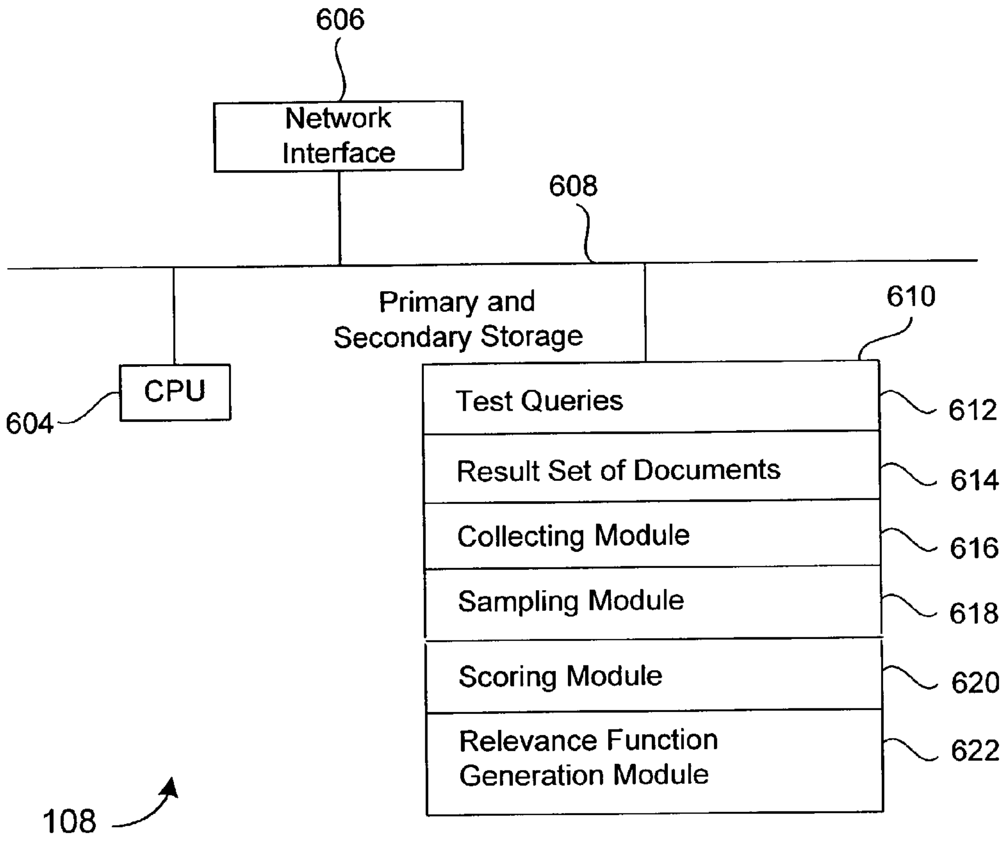
FIG. 6 is a block diagram of a relevance function determining system.

The present invention can be implemented as a computer program product that comprises a computer program mechanism embedded in a computer readable storage medium. Referring to FIG. 6, in some embodiments the relevance function determining system (108 in FIG. 1) includes one or more central processing units 604;

a network interface 606 for communication with other computers on the network (for example the search engine 106 depicted in FIG. 1);

primary and secondary storage 610 comprised of computer-readable media for storing one or more data structures and one or more modules for execution by central processing units(s) 604; and an internal bus 608 for transmitting and receiving electronic signals amongst the central processing unit(s) 604, network interface 606, and primary and secondary storage medium 608.

The program modules in storage 610 may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave. Storage 610 may include, at least:

a data structure 612 for storing the plurality of test queries; and a data structure 614 for storing data identifying or otherwise representing the result sets of documents; the data in this data structure 614 will typically include URL's referring to documents in the result set of documents.

Storage 610 may further include:

a collecting module 616 for collecting a respective result set of documents from the database for each of a plurality of test queries; the collecting module 616 will typically call a search engine module in the same or a different computer system to generate the result set of documents;

a sampling module 618 for selecting, for each test query of the plurality of test queries, a subset of the documents in the respective result set;

a scoring module 620 for assigning a set of training relevance scores to the documents in each selected subset; and a relevance function generation module 622 for determining a relevance function based on the plurality of test queries, the subsets of documents, and the sets of training relevance scores.

All references cited herein are incorporated herein by reference in their entirety and for all purposes to the same extent as if each individual publication or patent or patent application was specifically and individually indicated to be incorporated by reference in its entirety for all purposes.

The foregoing description, for purposes of explanation, used specific nomenclature to provide a thorough understanding of the invention. However, it will be apparent to one skilled in the art that the specific details are not required in order to practice the invention. The embodiments were chosen and described in order to best explain the principles of the invention and its practical applications, to thereby enable others skilled in the art to best utilize the invention and various embodiments with various modifications as are suited to the particular use contemplated. Thus, the foregoing disclosure is not intended to be exhaustive or to limit the invention to the precise forms disclosed. Many modifications and variations are possible in view of the above teachings.

It is intended that the scope of the invention be defined by the following claims and their equivalents

What is claimed is:

1. A method for determining a document relevance function for estimating a relevance score of a document in a database with respect to a query, comprising:

(a) collecting a respective result set of documents from the database for each of a plurality of test queries;

(b) for each test query of the plurality of test queries, selecting a subset of the documents in the respective result set; and assigning a set of training relevance scores to the documents in the subset; and (c) determining a relevance function based on the plurality of test queries, the subsets of documents, and the sets of training relevance scores;

(d) outputting a list of one or more documents ordered based on the determined relevance function.

2. The method of claim 1, wherein a document ranking function is determined based at least in part on the determined relevance function, the document ranking function:

receiving a set of documents from the database; receiving a query; and outputting an ordered list of the set of documents, the list ordered so that the document in the set having the highest relevance score, as determined by the relevance function, is the first document on the list.

3. The method of claim 1, wherein the plurality of test queries are selected by:

sampling, from logs of queries submitted by users to a search engine, a preliminary set of query strings;

eliminating from the preliminary set queries determined to be outside the scope of knowledge of a user base; and assigning remaining queries in the preliminary set to the plurality of test queries.

4. The method of claim 1, wherein the plurality of test queries are selected by:

sampling words from a lexicon of one-word entries; and assigning each of the words so sampled to the plurality of test queries.

5. The method of claim 4, wherein selecting the plurality of test queries further comprises:

selecting combinations of two or more words sampled from the lexicon and assigning the combinations to the plurality of test queries.

6. The method of claim 1, wherein selecting a subset comprises:

for each test query, selecting a document from the respective result set, determining a surrogate relevance score relating the selected document to the current query, and assigning the selected document to at least one relevance tier of a plurality of relevance tiers based on the determined surrogate relevance score; and repeating the document selecting step until each relevance tier contains at least a respective predefined number of documents.

7. The method of claim 6, wherein assigning the selected document comprises assigning the selected document to each tier in the plurality of relevance tiers for which the surrogate relevance score is greater than a respective predetermined threshold value of the tier.

8. The method of claim 6, wherein assigning the selected document comprises assigning the selected document to a tier in the plurality of relevance tiers for which the surrogate relevance score falls within a respective predetermined range of relevance scores associated with the tier.

9. The method of claim 8, wherein the respective predetermined ranges of relevance scores associated with the plurality of tiers are nonoverlapping.

10. The method of claim 6, wherein determining a surrogate relevance score comprises:

submitting the query to a search engine; and determining the surrogate relevance score as a function of a position of the document in a list of result pages provided by the search engine.

11. The method of claim 6, wherein assigning a set of training relevance scores comprises:

submitting each of a first plurality of documents in the subset to a plurality of human subjects, wherein the first plurality of documents have surrogate relevance scores within a predefined range, one or more human subjects determining an individual relevance score for each submitted document with respect to the query; and assigning a training relevance score to each submitted document with respect to the query based on the individual relevance scores determined by the human subjects.

12. The method of claim 11, wherein the individual relevance scores are numbers selected from a predetermined range and said assigning comprises computing an arithmetic mean of the individual relevance scores.

13. The method of claim 11, further including assigning to each of a second plurality of documents in the subset a training relevance score based on the surrogate relevance score determined for the document.

14. The method of claim 6, wherein determining a surrogate relevance score for the selected document comprises:

submitting the query to a plurality of search engines, each search engine returning a respective list of result pages from the database, each respective list of result pages including the selected document; and determining the surrogate relevance score in accordance with an average numerical position of the selected document in the lists of result pages.

15. The method of claim 1, wherein assigning a set of training relevance scores comprises:

submitting each of a first plurality of documents in the subset to a respective plurality of human subjects, each human subject in the respective plurality of human subject determining an individual relevance score for the submitted document with respect to the query; and assigning a training relevance score to each submitted document with respect to the query based on the individual relevance scores determined by the human subjects.

16. The method of claim 15, wherein the individual relevance scores are numbers selected from a predetermined range and said assigning comprises computing an arithmetic mean of the individual relevance scores.

17. The method of claim 15, further including assigning to each of a second plurality of documents in the subset a predefined low training relevance score.

18. The method of claim 1, wherein determining a relevance function comprises:

determining a set of features to be used as predictor variables in the construction of the relevance function, each of the features in the set comprising a function of one or more properties of a respective document, a respective query, or both;

parameterizing the relevance function in terms of a finite set of parameters and base functions, wherein each base function takes as its input a subset of said features and outputs a value;

defining a partial error relating the training relevance score of a given document with respect to a particular query to a value produced by the document relevance function as applied to the given document with respect to the particular query;

repeating the defining a partial error with respect to a plurality of given documents and a plurality of particular queries so as to produce a set of partial errors; and selecting the parameters so as to minimize a total error, wherein the total error is a function of the set of partial errors.

19. The method of claim 18, wherein the set of features includes at least one query-dependent feature and at least one query-independent feature.

20. The method of claim 18, wherein the set of features includes at least one of the following: Eignenrank (ER), Hub, URL Depth, Quality Score, Spam Index, Family Friendliness, Document Length, Anchor Text Score, Match Location, Match Frequency, Term Weight, and Proximity.

21. The method of claim 18, wherein the set of features includes at least four of the following: Eigenrank (ER), Hub, URL Depth, Quality Score, Spam Index, Family Friendliness, Document Length, Anchor Text Score, Match Location, Match Frequency, Term Weight, and Proximity.

22. The method of claim 18, wherein defining a partial error further comprises:

defining a set of classes;

assigning the given document to one or more of the classes based, at least in part, on the training relevance score of the given document.

23. The method of claim 22, wherein the partial error is determined at least in part by a ratio, the ratio being a ratio of the relevance function to a difference, the difference being a difference between one and the relevance function.

24. The method of claim 18, wherein the partial error is defined to be a function of the square of a difference between the training relevance score of a document and a value produced by the document relevance function.

25. The method of claim 18, wherein the partial error is defined to be a function of the absolute value of a difference between the training relevance score of a document and a value produced by the document relevance function.

26. The method of claim 18, wherein at least one of the base functions is a node classification tree and the finite set of parameters include associated splitting variables, splitting locations, and terminal node values.

27. The method of claim 18, wherein selecting the parameters so as to minimize a total error is accomplished via a Boost procedure.

28. The method of claim 18, wherein selecting the parameters so as to minimize a total error is accomplished via a GradientBoost procedure, and wherein the base functions include at least one classification and regression tree (CART).

29. A computer program product for use in conjunction with a computer system, the computer program product comprising a computer readable storage medium and a computer program mechanism therein, the computer program mechanism comprising:

(a) a collecting module for collecting a respective result set of documents from the database for each of a plurality of test queries;

(b) a sampling module for selecting, for each test query of the plurality of test queries, a subset of the documents in the respective result set;

(c) a scoring module for assigning a set of training relevance scores to the documents in each selected subset; and (d) a relevance function generation module for determining a relevance function based on the plurality of test queries, the subsets of documents, and the sets of training relevance scores.

30. The computer program product of claim 29, wherein the relevance function generation module further includes instructions for determining a document ranking function based at least in part on the determined relevance function, the document ranking function:

receiving a set of documents from the database;

receiving a query; and outputting an ordered list of the set of documents, the list ordered so that the document in the set having the highest relevance score, as determined by the relevance function, is the first document on the list.

31. The computer program product of claim 29, wherein the collecting module includes instructions for generating the plurality of test queries by:

sampling, from logs of queries submitted by users to a search engine, a preliminary set of query strings;

eliminating from the preliminary set queries determined to be outside the scope of knowledge of a user base; and assigning remaining queries in the preliminary set to the plurality of test queries.

32. The computer program product of claim 29, wherein the collecting module includes instructions for generating the plurality of test queries by:

sampling words from a lexicon of one-word entries; and assigning each of the words so sampled to the plurality of test queries.

33. The computer program product of claim 32, wherein the collecting module further includes instructions for: selecting combinations of two or more words sampled from the lexicon and assigning the combinations to the plurality of test queries.

34. The computer program product of claim 29, wherein the sampling module includes instructions for:

for each test query, selecting a document from the respective result set, determining a surrogate relevance score relating the selected document to the current query, and assigning the selected document to at least one relevance tier of a plurality of relevance tiers based on the determined surrogate relevance score; and repeating the document selecting step until each relevance tier contains at least a respective predefined number of documents.

35. The computer program product of claim 34, wherein the sampling module further includes instructions for:

assigning the selected document to each tier in the plurality of relevance tiers for which the surrogate relevance score is greater than a respective predetermined threshold value of the tier.

36. The computer program product of claim 34, wherein the sampling module further includes instructions for:

assigning the selected document to a tier in the plurality of relevance tiers for which the surrogate relevance score falls within a respective predetermined range of relevance scores associated with the tier.

37. The computer program product of claim 36, wherein the respective predetermined ranges of relevance scores associated with the plurality of tiers are nonoverlapping.

38. The computer program product of claim 34, wherein the sampling module further includes instructions for:

for each test query, submitting the query to a search engine; and determining the surrogate relevance score of a document in the subset as a function of a position of the document in a list of result pages provided by the search engine.

39. The computer program product of claim 34, wherein the scoring module includes instructions for:

submitting each of a first plurality of documents in the subset to a plurality of human subjects, wherein the first plurality of documents have surrogate relevance scores within a predefined range, each human subject determining an individual relevance score for the submitted document with respect to the query; and assigning a training relevance score to each submitted document with respect to the query based on the individual relevance scores determined by the human subjects.

40. The computer program product of claim 39, wherein the individual relevance scores are numbers selected from a predetermined range and said assigning comprises computing an arithmetic mean of the individual relevance scores.

41. The computer program product of claim 39, wherein the scoring module further includes instructions for:

assigning to each of a second plurality of documents in the subset a training relevance score based on the surrogate relevance score determined for the document.

42. The computer program product of claim 34, wherein the sampling module further includes instructions for determining a surrogate relevance score relating the selected document to the current query by:

submitting the query to a plurality of search engines, each search engine returning a respective list of result pages from the database, each respective list of result pages including the selected document; and determining the surrogate relevance score in accordance with an average numerical position of the selected document in the lists of result pages.

43. The computer program product of claim 29, wherein the scoring module includes instructions for:

submitting each of a first plurality of documents in each selected subset to a plurality of human subjects, each human subject determining an individual relevance score for the submitted document with respect to the query; and assigning a training relevance score to each submitted document with respect to the query based on the individual relevance scores determined by the human subjects.

44. The computer program product of claim 43, wherein the individual relevance scores are numbers selected from a predetermined range and said assigning comprises computing an arithmetic mean of the individual relevance scores.

45. The computer program product of claim 43, wherein the scoring module further includes instructions for:

assigning to each of a second plurality of documents each selected subset a predefined low training relevance score.

46. The computer program product of claim 29, wherein the determining module includes instructions for:

parameterizing the relevance function in terms of a finite set of parameters and base functions, wherein each base function outputs a value for a respective input set of features, each feature comprising a function of one or more properties of a respective document, a respective query, or both;

defining a partial error relating the training relevance score of a given document with respect to a particular query to a value produced by the document relevance function as applied to the given document with respect to the particular query;

repeating the defining a partial error with respect to a plurality of given documents and a plurality of particular queries so as to produce a set of partial errors; and selecting the parameters so as to minimize a total error, wherein the total error is a function of the set of partial errors.

47. The computer program product of claim 46, wherein the set of features includes at least one query-dependent feature and at least one query-independent feature.

48. The computer program product of claim 46, wherein the set of features includes at least one of the following: Eignenrank (ER), Hub, URL Depth, Quality Score, Spam Index, Family Friendliness, Document Length, Anchor Text Score, Match Location, Match Frequency, Term Weight, and Proximity.

49. The computer program product of claim 46, wherein the set of features includes at least four of the following: Eignenrank (ER), Hub, URL Depth, Quality Score, Spam Index, Family Friendliness, Document Length, Anchor Text Score, Match Location, Match Frequency, Term Weight, and Proximity.

50. The computer program product of claim 46, wherein the determining module further includes instructions for:

defining a set of classes; assigning the given document to one or more of the classes based, at least in part, on the training relevance score of the given document.

51. The computer program product of claim 50, wherein the determining module further includes instructions for:

defining the partial error, the partial error defined at least in part by a ratio, the ratio being a ratio of the relevance function to a difference, the difference being a difference between one and the relevance function.

52. The computer program product of claim 46, wherein the determining module further includes instructions for:

defining the partial error to be a function of the square of a difference between the training relevance score of a document and a value produced by the document relevance function.

53. The computer program product of claim 46, wherein the determining module further includes instructions for:

defining the partial error to be a function of the absolute value of a difference between the training relevance score of a document and a value produced by the document relevance function.

54. The computer program product of claim 46, wherein at least one of the base functions is a node classification tree and the finite set of parameters include associated splitting variables, splitting locations, and terminal node values.

55. The computer program product of claim 46, wherein the determining module further includes instructions for: selecting the parameters so as to minimize a total error is accomplished via a Boost procedure.

56. The computer program product of claim 46, wherein the determining module includes instructions for:

parameterizing the relevance function in terms of at least one classification and regression tree (CART); and selecting the parameters so as to minimize a total error is accomplished via a GradientBoost procedure.

* * * * *